United States Patent [19]
Kuesters

[11] Patent Number: 6,113,504
[45] Date of Patent: Sep. 5, 2000

[54] GOLF BALL LOCATOR

[75] Inventor: Eckhard H. Kuesters, Woodbine, Md.

[73] Assignee: Oblon, Spivak, McClelland, Maier & Neustadt, P.C., Arlington, Va.

[21] Appl. No.: 09/110,568

[22] Filed: Jul. 10, 1998

[51] Int. Cl.[7] ................................................. A63B 43/00
[52] U.S. Cl. .......................... 473/353; 473/152; 473/155; 473/199; 473/200; 473/156; 473/570
[58] Field of Search ................................. 473/353, 152, 473/155, 198, 199, 200, 165, 156, 570

[56] References Cited

U.S. PATENT DOCUMENTS

| | | | |
|---|---|---|---|
| 3,351,347 | 11/1967 | Smith et al. | 473/199 |
| 3,458,205 | 7/1969 | Smith et al. | 473/199 |
| 3,782,730 | 1/1974 | Horchler | 473/353 |
| 3,886,553 | 5/1975 | Bates . | |
| 4,229,740 | 10/1980 | Krilanovich . | |
| 4,742,357 | 5/1988 | Rackley . | |
| 4,791,572 | 12/1988 | Green, III et al. . | |
| 4,799,062 | 1/1989 | Sanderford, Jr. et al. | 342/407 |
| 4,926,161 | 5/1990 | Cupp | 340/988 |
| 5,003,317 | 3/1991 | Gray et al. . | |
| 5,029,866 | 7/1991 | Beard, III et al. | 273/181 R |
| 5,095,430 | 3/1992 | Bonito et al. | 700/92 |
| 5,097,416 | 3/1992 | Matthews | 700/91 |
| 5,112,055 | 5/1992 | Barnhill | 473/199 |
| 5,324,028 | 6/1994 | Luna | 473/169 |
| 5,342,051 | 8/1994 | Rankin et al. | 473/199 |
| 5,413,345 | 5/1995 | Nauck | 473/156 |
| 5,423,549 | 6/1995 | Engelmeier | 463/353 |
| 5,447,314 | 9/1995 | Yamazaki et al. | 473/353 |
| 5,564,698 | 10/1996 | Honey et al. . | |
| 5,582,550 | 12/1996 | Foley | 473/153 |
| 5,641,963 | 6/1997 | Mueller . | |
| 5,664,880 | 9/1997 | Johnson et al. | 473/407 |
| 5,717,406 | 2/1998 | Sanderford et al. . | |
| 5,751,409 | 5/1998 | Koyama . | |
| 5,797,809 | 8/1998 | Hyuga | 473/407 |
| 5,910,057 | 6/1999 | Quimby et al. | 473/353 |
| 5,938,545 | 8/1999 | Cooper et al. | 473/407 |

FOREIGN PATENT DOCUMENTS

| | | |
|---|---|---|
| 2 616 335 | 12/1988 | France . |
| 1172449 | 11/1969 | United Kingdom . |
| 2 247 177 | 2/1992 | United Kingdom . |

OTHER PUBLICATIONS

Patent Abstracts of Japan, #4–53575, Feb. 21, 1992, Kazuo Kamata.

"Radio–Electronics," Transistorized Golf Ball, Jun., 1956, p. 79.

*Primary Examiner*—Jessica J. Harrison
*Assistant Examiner*—Julie Kasick
*Attorney, Agent, or Firm*—Oblon, Spivak, McClelland, Maier & Neustadt, P.C.

[57] ABSTRACT

A golf ball locator system. The golf ball comprises a transmitter that transmits a coded signal, identifying the ball, and that is received by an array of receivers. The receivers measure either the angle of arrival, or the time of arrival of the signal, which is transmitted to a processor that uses triangulation calculations to generate location coordinates of the golf ball. The processor then transmits the location coordinates to a display unit. The display unit can be portable and viewed by the golfer. The display unit can simply display golf ball position coordinates in relation to a pre-existing golf course map, or display the golf ball on a map which may include various landmarks of the golf course. The system can further include a player location device that allows the system to give audio or visual traveling instructions to assist the golfer to locate his/her ball.

24 Claims, 8 Drawing Sheets

GOLF BALL LOCATOR

BACKGROUND OF THE INVENTION

1. Field of the Invention

The present invention relates to a golf ball locator system and a golf ball used in the system.

2. Discussion of the Background

All golf players, especially beginners, are familiar with the frustration of losing a golf ball. Beyond the embarrassment of losing golf balls, golf players suffer a loss of time in trying to locate them, the loss of money in purchasing new golf balls, and a loss of concentration, not to mention the penalty imposed for losing golf balls during competition.

A number of schemes have been proposed to address this issue. For example, GB 1172449 teaches radioactive material inside a golf ball and a handheld Geiger counter to locate it. GB 1172449 states that "the quantity and nature of the radioactive material should be chosen so that the resulting intensity of radiation will not be injurious to a human being handling the golf ball . . . ". This system has, therefore, a rather severe constraint that limits its detection range. Furthermore, unrecovered radioactive golf balls could accumulate within a golf course and could, over time, render the golf course less than safe.

Another document related to golf ball location is FR 2616335. This document teaches a golf ball with an electromagnetic wave transmitter consisting of an integrated circuit comprising a timing circuit. In this device, the golf player holds a locating device featuring a visual and/or sound signal which has an intensity in relation to the distance from the golf player to the golf ball. As in the first example, this device's detection range is limited to a local area. In fact, FR 2616335 teaches that the power of the transmitter is determined so that a ball can only be detected within a given parameter, for example, 100 meters.

In Englmeier (U.S. Pat. No. 5,423,549), a golf ball transmits electromagnetic signals to a mobile signal receiving unit for locating golf balls. Further provided is a voltage source that is recharged through a wireless transmission, and a timing circuit. The mobile signal receiving unit produces an output signal that has an intensity in relation to the distance from the golf player to the golf ball.

A problem with devices such as these is the extensive search that a golf player has to perform in order to locate his or her golf ball. In fact, a golfer having just teed off, must first place himself or herself within the detection range of the device. This initial step has to be performed without the help of a locating device, and in cases where the golfer's line of vision is obstructed by obstacles, this initial step may not be successful, so that the golf ball is never recovered. Once the golfer is within range of the golf ball, the second step is to rotate up to 360° to determine the general direction from which the golf ball's signal is coming. Finally, the golfer must walk forward slowly in that direction until he or she finds the golf ball. This procedure may lead to enough frustration and loss of time that the golfer may choose to abandon the search, and may therefore defeat the very purpose of the golf ball locator.

A second problem with the above mentioned examples of related art is the fact that these devices only provide information about the position of a golf ball relative to a signal receiving device. In other words, they do not provide any information on the location of the golf balls relative to other landmarks on the golf course, such as the flag, the sand bunkers, the club house or other buildings and significant obstacles.

SUMMARY OF THE INVENTION

Consequently, there is a need for a system to locate golf balls safely, providing individual golfers with the location of their lost golf balls within a range that can span an entire golf course, or any portions thereof. Furthermore, there is a need for a system to provide golfers with the position of their golf balls relative to various obstacles and targets of a golf course. Such information would be useful to the golfers, especially beginners, who are unsure of the distances between their golf ball and various obstacles or targets and are therefore unsure of the type of club needed for the next shot.

Accordingly, one object of this invention is to safely provide a system capable of giving individual golfers the location of their golf ball.

Another object of the present invention is to provide a system locating golf balls within a range that can span an entire golf course or portions thereof, for example a single hole.

Still another object of the present invention is to provide a system in which all the functions performed to give the location of the golf ball are performed by the system.

Yet another object of the present invention is to provide a system giving individual golfers information related to distances between their ball and various golf course obstacles and targets.

These and other objects are accomplished by providing a system that includes at least one golf ball including a transmitter that transmits an electromagnetic signal, at least two electromagnetic signal receivers, a coordinate system to map out the golf course, a processor which performs triangulation calculations to determine location, and at least one display unit which displays the location processed by the processor.

After being hit, the golf ball transmits an electromagnetic signal which is received by the electromagnetic receivers. The electromagnetic receivers, then determine 1) the identification of the particular golf ball and 2) the angle of arrival of the signal and/or the distance between the golf ball and the electromagnetic receivers. The electromagnetic receivers send this data to the processor which then uses conventional triangulation methods to generate position coordinates for the particular golf ball. These position coordinates belong to the coordinate system mapping out the golf course, or parts thereof. The processor causes a visual and/or audio display of the location of the golf ball, for example providing the location coordinates and/or a terrain display with the location identified, and/or audio location information using landmarks on the golf course.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
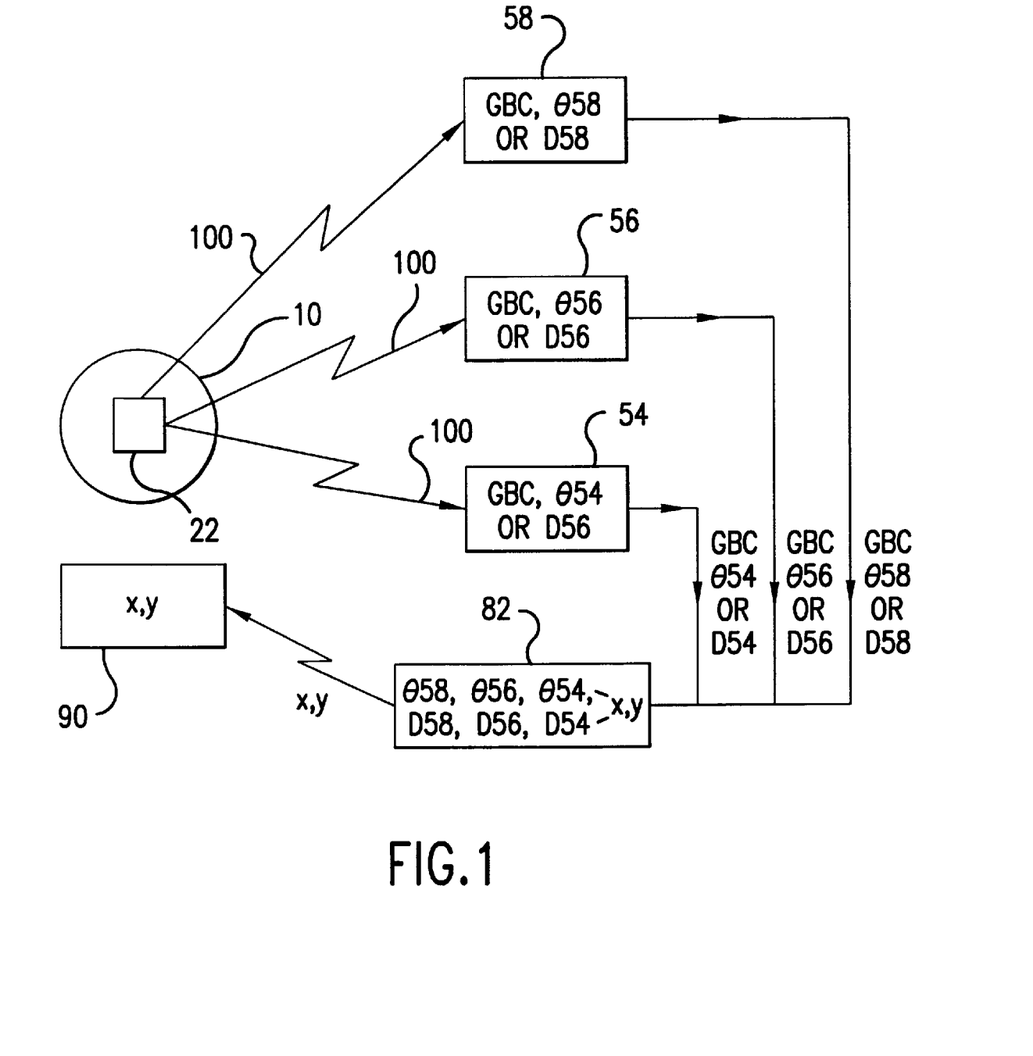
FIG. 1 is a block diagram of the general relationships between various elements of the present invention.

Referring now to the drawings, wherein like reference numerals designate identical or corresponding parts throughout the several views, and more particularly to FIG. 1 thereof, there is illustrated a golf ball 10 comprising an electromagnetic transmitter 22 that transmits an electromagnetic signal 100. The electromagnetic signal 100 is received by electromagnetic receivers 54, 56 and 58 that determine 1) a golf ball code GBC for identification of golf ball 10 and 2) angles of arrival θ54, θ56 and θ58 of signal 100 as taught for example in Krilanovich (U.S. Pat. No. 4,229,740) and Rackley (U.S. Pat. No. 4,742,357) both incorporated as reference herein, and/or distances D54, D56 and D58 between the golf ball 10 and the receivers 54, 56 and 68 as taught for example in Bates (U.S. Pat. No. 3,886,553), U.S. Pat. No. 4,742,357 and Sanderford et al (U.S. Pat. No. 4,799,062) all three incorporated as reference herein. Electromagnetic receivers 54, 56 and 58 then transmit this data to processor 82 that performs triangulation calculations using θ54, θ56, θ58, as taught for example in U.S. Pat. No. 4,229,740, or using D54, D56, D58 as taught for example in U.S. Pat. No. 3,886,553 and U.S. Pat. No. 4,799,062, to generate global coordinates X,Y belonging to a coordinate system (shown in FIG. 5) mapping out a golf course (shown in FIG. 5). The processor then transmits global coordinates X,Y to display unit 90 which can be viewed by the golfer playing golf ball 10.

Figures 2A, 2B, 2C:
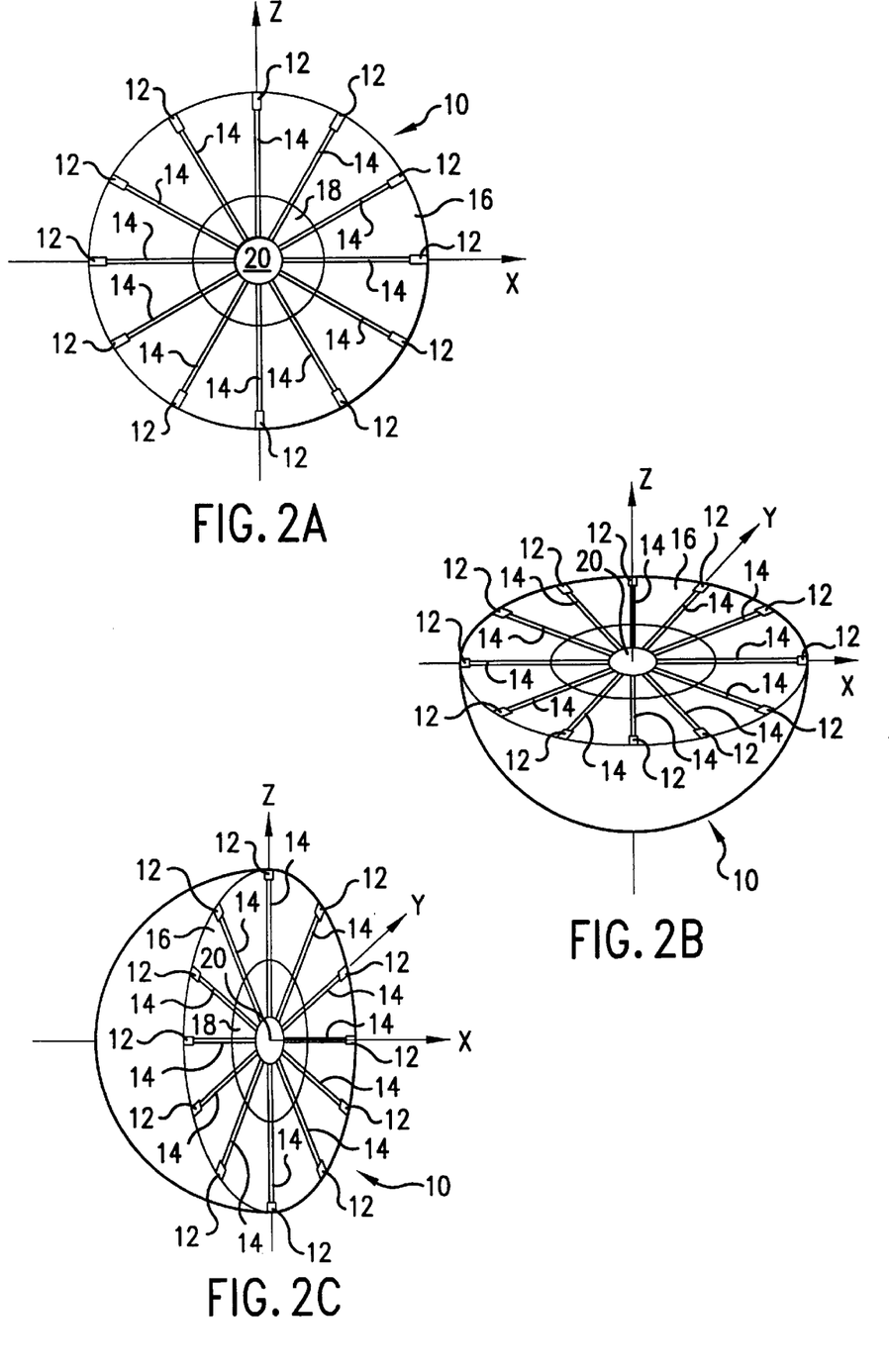
FIG. 2a is a cross-sectional view of the X-Z plane of a first embodiment golf ball according to the present invention.
FIG. 2b is a cross-sectional view of the X-Y plane of a first embodiment golf ball according to the present invention.
FIG. 2c is a cross-sectional view of the Y-Z plane of a first embodiment golf ball according to the present invention.

A first embodiment of the present invention is fully disclosed in connection with FIGS. 2–8 as discussed below. FIGS. 2A–C illustrate a golf ball 10 including thirty infrared emitting diodes 12 which are evenly distributed over three perpendicular planes namely the X-Z, Y-Z, and X-Y planes. In this first embodiment, a 30° angle separates two consecutive diodes of a same plane. However, other distributions of the diodes would work within the scope of the present invention. Each infrared emitting diode 12 is connected via connecting wires 14 to an electronic chamber 20. Golf ball 10 comprises three concentric parts, namely an outer member 16, an inner member 18, and the electronic chamber 20. Outer member 16 can be made of a shock absorbing synthetic material, and inner member 18 can be made of a harder material to protect the electronic chamber 20. Furthermore, electronic chamber 20 can be filled with a resin embedding any electronic components part of electromagnetic transmitter 22, thereby keeping them from moving or vibrating. Golf ball 10 can also be enveloped with a thin protective cover (not shown) transparent to infrared radiation.

The content of Honey et al (U.S. Pat. No. 5,564,698) is specifically incorporated by reference herein. This patent teaches an electromagnetic transmitting hockey puck including 20 infrared emitting diodes powered by an electronic circuit. Electromagnetic transmitter 22 can be essentially the same as the one taught in U.S. Pat. No. 5,564,698 modified to fit in a golf ball with a weight not more than 45.93 gm and a diameter not less than 42.67 mm, as required by the rules of golf.

Other embodiments of the present invention comprise electromagnetic transmitter working at different frequencies. For example, radio frequencies can be generated using oscillating circuits and antennas similar to the one taught in U.S. Pat. No. 5,423,549 incorporated as reference herein. Furthermore, the electromagnetic transmitter of the present invention can comprise a signal modulator for frequency modulation, and/or amplitude modulation, and/or phase modulation and/or spread spectrum modulation circuits. For example, the present invention can work with a similar signal modulator as taught in U.S. Pat. No. 4,799,062, and U.S. Pat. No. 4,742,357.

Figure 3:
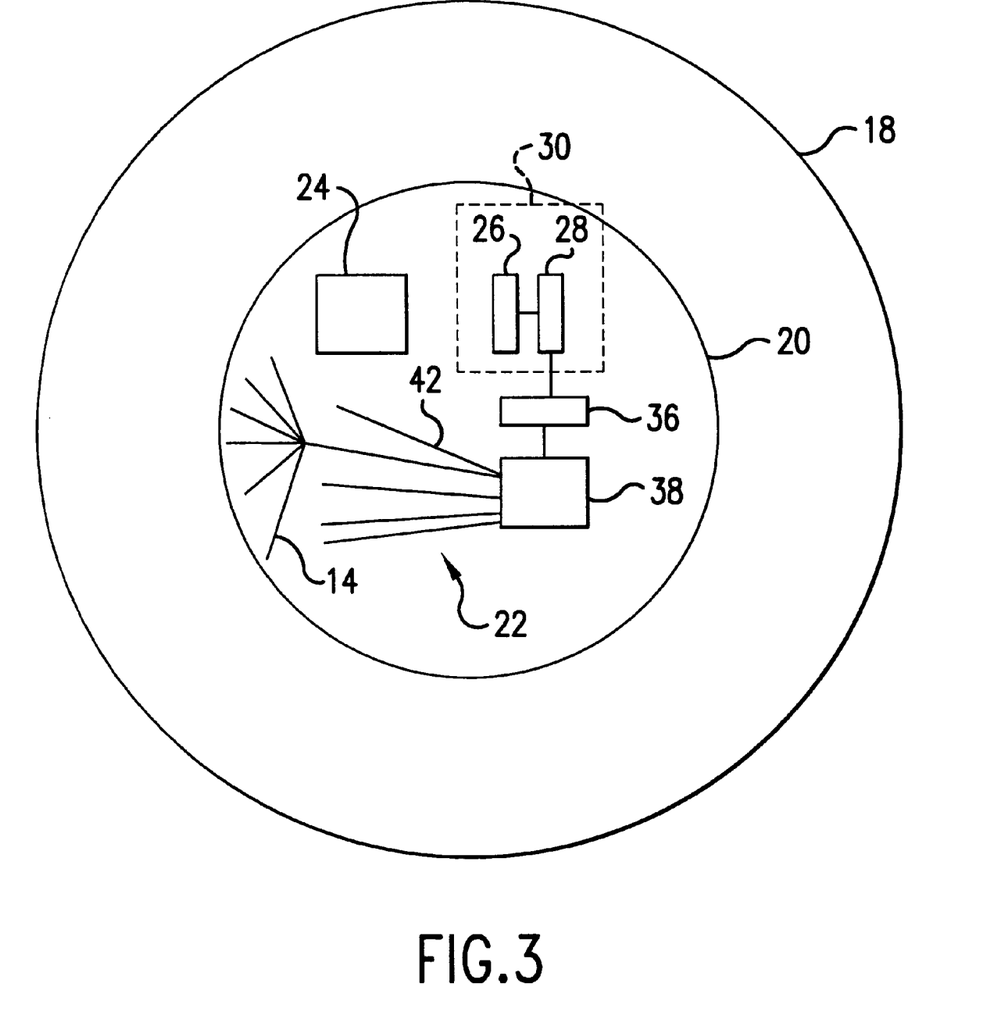
FIG. 3 is a block diagram of the electronic circuit located inside a first embodiment golf ball according to the present invention.

FIG. 3 illustrates a block diagram of the electromagnetic transmitter 22 located inside electronic chamber 20. Electromagnetic transmitter 22 comprises a power source 24, which can be a battery or a combination of batteries. Power source 24 can also be rechargeable by induction or electromagnetic radiation. Electromagnetic transmitter 22 further comprises an ON/OFF switch 30 comprising a shock sensor 26 to close the switch and a first timing circuit 28 to open it after a time T1, for example after 20 seconds. Such shock sensors and timing circuit combination are known to persons of ordinary skills in the art. For example, the shock sensor can be made of a piezoelectric material as taught in FR 2616335. Another possibility, taught in U.S. Pat. No. 5,564,698 and incorporated as reference herein, would be to use a thin metal wire in close proximity to the inside wall of a metal cylinder. The metal wire moving under a shock and touching the metal cylindrical wall closes the switch momentarily, and an edge detector circuit closes the switch until the timing circuit opens it.

The advantage of using such an ON/OFF switch is to increase the lifetime of the power source 24. As discussed below, to locate a golf ball, the system of the present invention only needs an electromagnetic signal for a very short time, i.e. a few seconds. It is, therefore, not necessary to keep the electromagnetic transmitter 22 powered constantly, nor for a relatively long time. To save power, electromagnetic transmitter 22 may further include a second timing circuit 36 to delay the transmission of the electromagnetic signal during a time T2. This delay is advantageous in a system of the present invention which only requires an electromagnetic transmission after the golf ball has come to rest. For example, and assuming that most golf balls do not move for more than several seconds after being hit, the secondary timing circuit 36 can be set to delay transmission of the electromagnetic signal for several seconds.

However, second timing circuit 36 is not essential for to the present invention. Instead, in one preferred embodiment, the transmitter continuously transmits an electromagnetic signal from the time the switch 30 is turned ON, i.e. when the golfer hits the ball, to the time switch 30 is turned OFF. In this case, the system can monitor the signal during the ball's flight in order to determine its flight path. The flight path can be used to interpolate the golf ball's location in the event the transmission is not received for some reason when the ball comes to rest, e.g. as may result if the ball falls in a hole or its transmission is obstructed by some obstacle. The interpolation typically will be performed on the basis of an algorithm utilizing ball flight path and perhaps also speed and acceleration, and perhaps also weather conditions (wind, temperature and humidity) depending on the degree of interpolation accuracy desired. Alternatively, interpolation tables can be empirically derived and stored for use by the processor.

Additionally, the interpolated golf ball position can be compared to the triangulated golf ball position when the golf ball signal is not lost after the ball comes to rest. Either or both of the interpolated and triangulated golf ball position can be transmitted to the player and displayed. Likewise, when the comparison indicates a large difference between the interpolated and triangulated positions, or when the golf ball signal is lost for whatever reason as above noted, a warning "low reliability" signal can be transmitted to the player accordingly.

In order to further save the energy from the power source 24, the electromagnetic transmitter 22 comprises a pulsing circuit 38, such as for example the one taught in U.S. Pat. No. 5,564,698, enabling an infrared signal to be pulsed at a pulsing frequency. Such pulsing circuits are well known to persons of ordinary skills in the art. In a first embodiment of the present invention, the golf ball code GBC is the pulsing frequency. The electromagnetic receivers thus identify each golf ball by identifying the pulsing frequency. By providing each golf ball with a unique pulsing frequency, the system of the present invention can identify each golf ball individually.

Other golf ball codes are possible. For example, pulsing circuit 38 can be a duration modulation circuit providing a pulse of signal 100 for a unique duration. In this case, the GBC is the pulsing duration. Alternatively, pulsing circuit 38 can be an amplitude modulating circuit providing a pulse of signal 100 with a unique amplitude. In this case, the GBC is the pulsing amplitude. Also, pulsing circuit 38 can be a code modulation circuit providing a sequence of ON/OFF pulses of signal 100. In this case, the GBC is the pulsing sequence. Other coding schemes include frequency modulation, phase modulation or spread spectrum modulation of a carrier signal, all of which, along with the ones described above, are known to a person of ordinary skills in the art of data transmission. For example, some of these techniques are discussed in Chapter 13 of *The Art of Electronics* (P. Horowitz and W. Hill, 1989) incorporated as reference herein.

Figure 4:
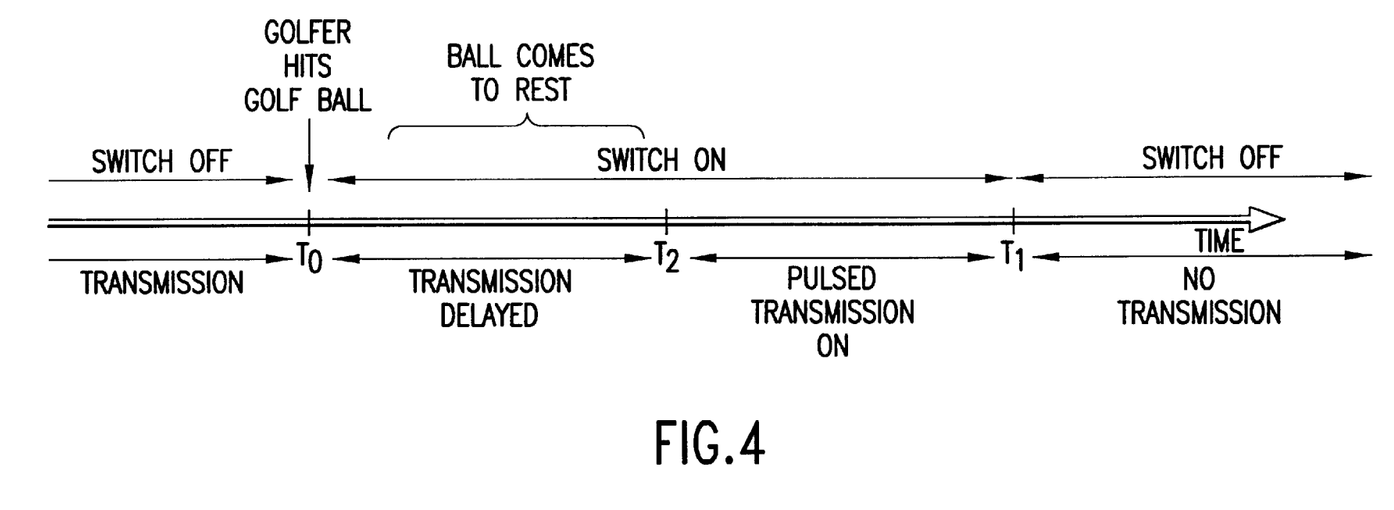
FIG. 4 is a time line indicating the status of the ON/OFF switch 30 and the transmission status according to the first embodiment of the present invention.

The time line of the above description is illustrated in FIG. 4. Time T0 is defined as the time when a golfer hits a golf ball. Before T0, switch 30 is in the OFF position and no electromagnetic signal is transmitted. The switch 30 is turned ON at T0 by the shock sensor 26 and stays ON until the first timing circuit 28 turns it OFF at T1. From T0 to T2, the switch 30 is therefore ON, however, second timing circuit 36 delays the transmission since the golf ball is typically moving during most of that time. The golf ball typically comes to rest at some time just before T2. At T2, second timing circuit 36 stops the delay of the transmission and a pulsed electromagnetic signal is being transmitted until T1. At T1 the switch 30 is turned OFF by the first timing circuit 28 thereby terminating the transmission.

Finally, electromagnetic transmitter 22 comprises leads 42 to connect with connecting wires 14 and with the infrared emitting diodes 12. In this first embodiment, each lead 42 is connected to six emitting diodes 12 connected in series via six connecting wires 14.

Figure 5:
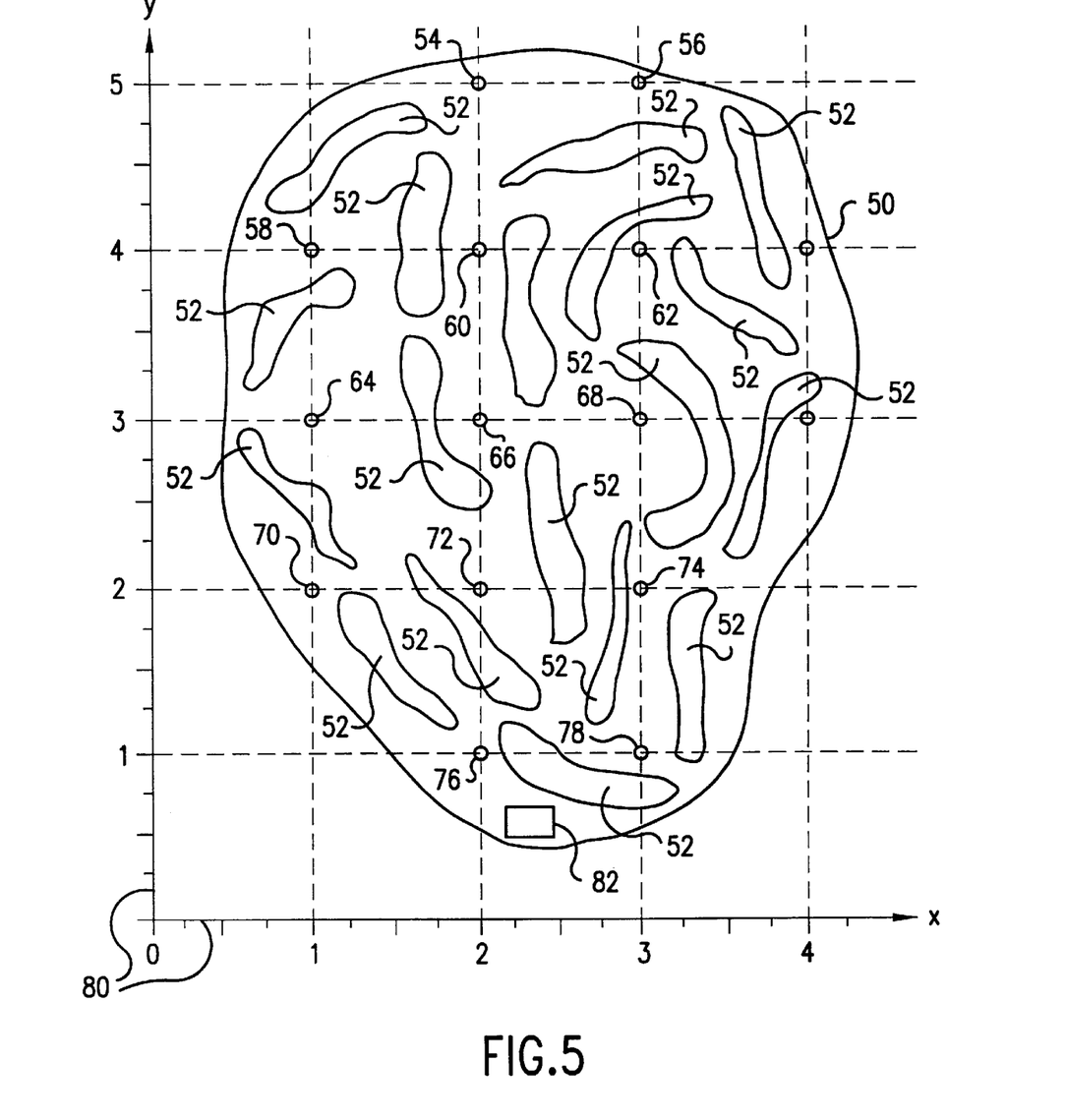
FIG. 5 is a schematic top view of a first embodiment golf course according to the present invention.

FIG. 5 illustrates a schematic view of a golf course 50 with golf course holes 52 and comprising an array of electromagnetic receivers 54–78. The golf course 50 is mapped out by an X-Y coordinate system 80.

In this first embodiment, the electromagnetic receivers 54–78 are elevated directional finders. Elevated directional finders 54–78 comprise an angle of arrival detection system to measure the angles of arrival θ54–θ78 of the electromagnetic signal 100. For example, a detection system similar to the one taught in U.S. Pat. No. 4,229,740 and U.S. Pat. No. 4,742,357 and appropriately modified can be used for the present invention. It is also possible to use distance finders measuring the time of arrival of signal 100 at the distance finder, as disclosed for example in U.S. Pat. No. 3,886,553, U.S. Pat. No. 4,742,357 and U.S. Pat. No. 4,799,062. These technologies, namely angle of arrival and time of arrival measurements, are well known to persons skilled in the art and may be appropriately modified for use in the system of the present invention. For example, elevated directional finders 54–78 can comprise an array of infrared sensors. The array of infrared sensors spans a 360 degree field of vision, but each of the sensor receives a signal through a narrow window spanning only a fraction of the array's field of vision, for example a 1 degree span per infrared sensor. Alternatively, an infrared detection similar to the one taught in Mueller (U.S. Pat. No. 5,641,963), or an optical apparatus as disclosed in Koyama (U.S. Pat. No. 5,751,409), both incorporated as reference herein, and appropriately modified can be used in the present invention.

Elevated directional finders 54–78 further comprise an identification circuit for measuring the pulsing frequency of the signal so as to identify the golf ball by a particular pulsing frequency. Alternatively, as discussed above, the electromagnetic signal can be frequency modulated, and/or amplitude modulated, and/or phase modulated and/or spread spectrum modulate. In these embodiments, the identification circuit identifies the golf ball by a particular modulation. Such identification circuits are well known to persons of ordinary skills in the art. For example, the present invention can work with an appropriately modified identification circuit similar to the one taught in U.S. Pat. No. 4,742,357, which is incorporated as reference herein and which discloses an electronic control unit that identifies a vehicle identification number.

Elevated directional finders 54–78 can be mounted on a pole or a post, or attached to a tree or a lamp post, or any elevated fixture. Preferably, they should be mounted so that their field of vision is as wide as possible. In order to increase the signal to noise ratio, elevated directional finders 54–78 can be protected from infrared radiation from the sun by providing them with an infrared "cap". This infrared "cap" can either reflect infrared radiation from the sun or absorb it, as long as the infrared radiation from the sun does not reach the sensors of the elevated directional finders.

In FIG. 5, the number of elevated directional finders is 15, but the present invention could work with a greater or a lesser number than 15. The minimum number of elevated directional finders is 2, however, in some situations where the golf ball is aligned with the two elevated directional finders, a third elevated directional finder is necessary to locate the golf ball. Because of the limited range of the infrared signal and because of obstacles possibly hiding the golf ball from the elevated directional finders, it is preferable to use an array of many. Furthermore, the directional finders need not be uniformly placed on the golf course, but instead can be spaced in relation to the peculiarities of each hole. However, other embodiments including a radio frequency transmission, for example similar to U.S. Pat. No. 4,799,062 and U.S. Pat. No. 4,742,357, can work with a limited number of receivers.

FIG. 5 also shows processor 82 which may be located anywhere on the golf course, and even outside the golf course, provided that control unit 82 can receive data from elevated directional finders 54–78 and transmit data to the display units discussed below, either using hard-wire connections or using wireless communication.

Figure 6:
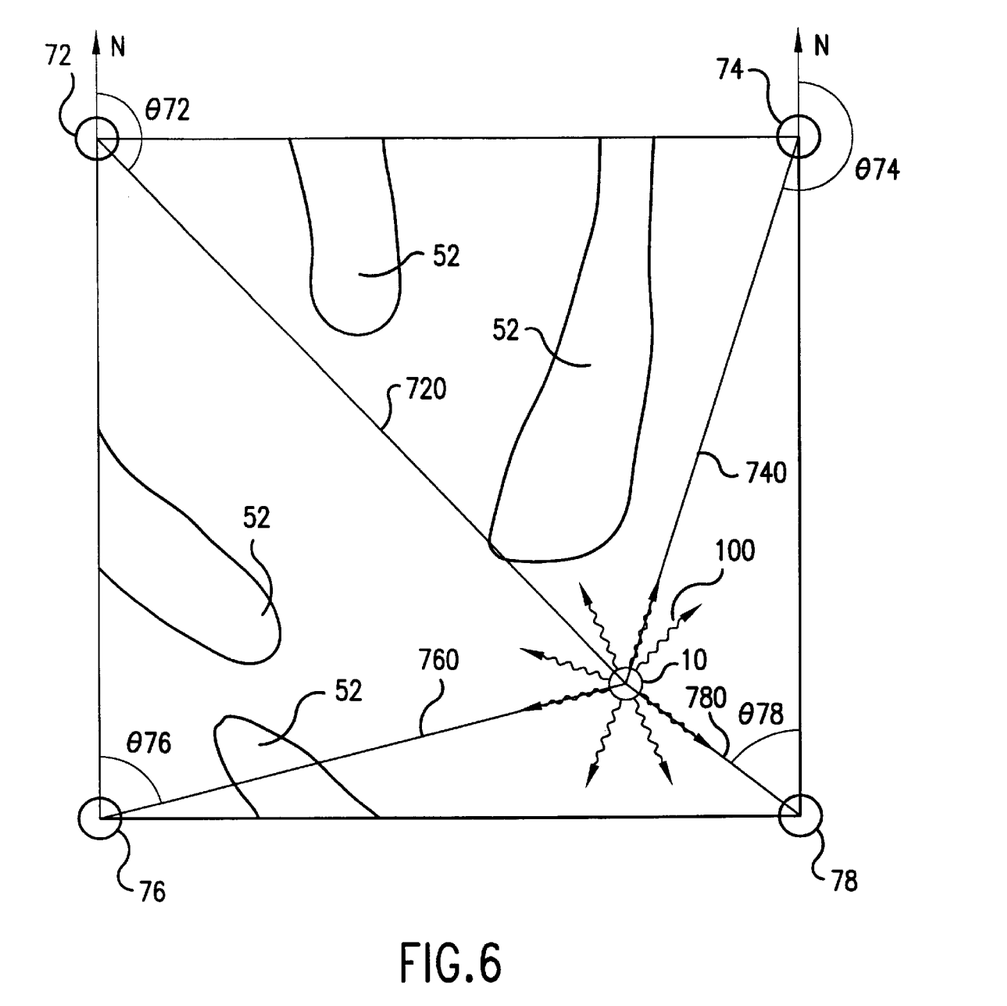
FIG. 6 is a schematic top view of a portion of a first embodiment golf course according to the present invention.

FIG. 6 illustrates a portion of the golf course 50 corresponding to X from 2 to 3 and Y from 1 to 2 of FIG. 5. Golf ball 10 is at rest and is transmitting a pulsed coded infrared signal 100. Elevated directional finders 72, 74, 76, 78 determine 1) the signal amplitude (SA) of the pulsed coded infrared signal 100, 2) the golf ball code (GBC), i.e. the pulsing frequency of signal 100, identifying golf ball 10 and 3) the angles θ72, θ74, θ76 and θ78 between the directions 720, 740, 760, 780 and the North direction. Here, the North direction is chosen arbitrarily. Any predetermined direction can be chosen as long as all elevated directional finders use the same predetermined direction. Finally, elevated directional finders 72–78 transmit this data, specifically the signal amplitude SA, the identifying code GBC and the angles θ72, θ74, θ76 and θ78, to the control unit 82.

Figure 7:
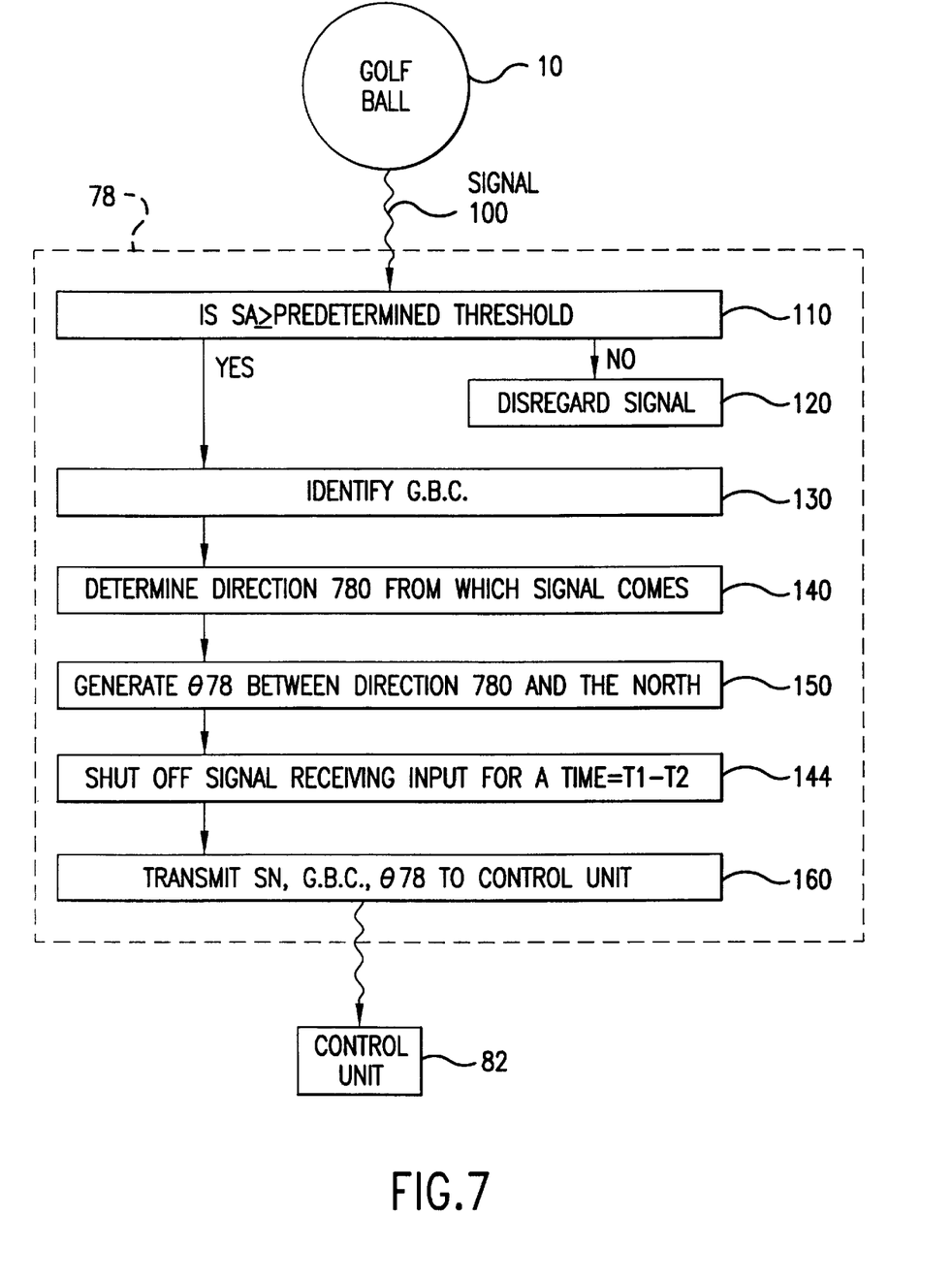
FIG. 7 is a flow chart indicating the steps performed by the first embodiment elevated directional finder according to the present invention.

FIG. 7 illustrates the steps taken by elevated directional finders 78 after receiving an infrared signal 100 from golf ball 10 through a signal receiving input (not shown). In step 110, the elevated directional finder 78 receives a pulsed coded infrared signal 100 from golf ball 10. Finder 78 first determines whether the signal amplitude SA of signal 100 is greater than a predetermine threshold. If SA is less than the predetermine threshold then finder 78 performs step 120 and disregards the signal. If SA is equal to or greater than the predetermined threshold, then finder 78 performs step 130 and identifies golf ball 10's code GBC. Step 120 is used to eliminate any background infrared radiation that finder 78 receives. Finder 78 then determines in step 140 the direction 780 from which golf ball 10 is transmitting the signal 100. Since signal 100 is transmitted during a time equal to T1 minus T2 as discussed above in relation to FIG. 3, steps 110–140 can be performed during that time, which can be made as long as 10 seconds. While the above sequence of steps 110–140 is shown in FIG. 7, however other sequences can be used.

After determining direction 780, finder 78 then shuts off the signal receiving input in step 144 for a time equal to T1 minus T2 so that the same signal 100 is not analyzed more than once by finder 78.

In step 150, the finder 78 generates angle θ78 between direction 780 and the North direction. Finally, step 160 is performed and finder 78 transmits the data comprising the signal amplitude SA, the golf ball identifying code GBC and the angle θ78 to the processor 82. This data transmission can be performed by wireless communication or by wired transmission.

Figure 8:
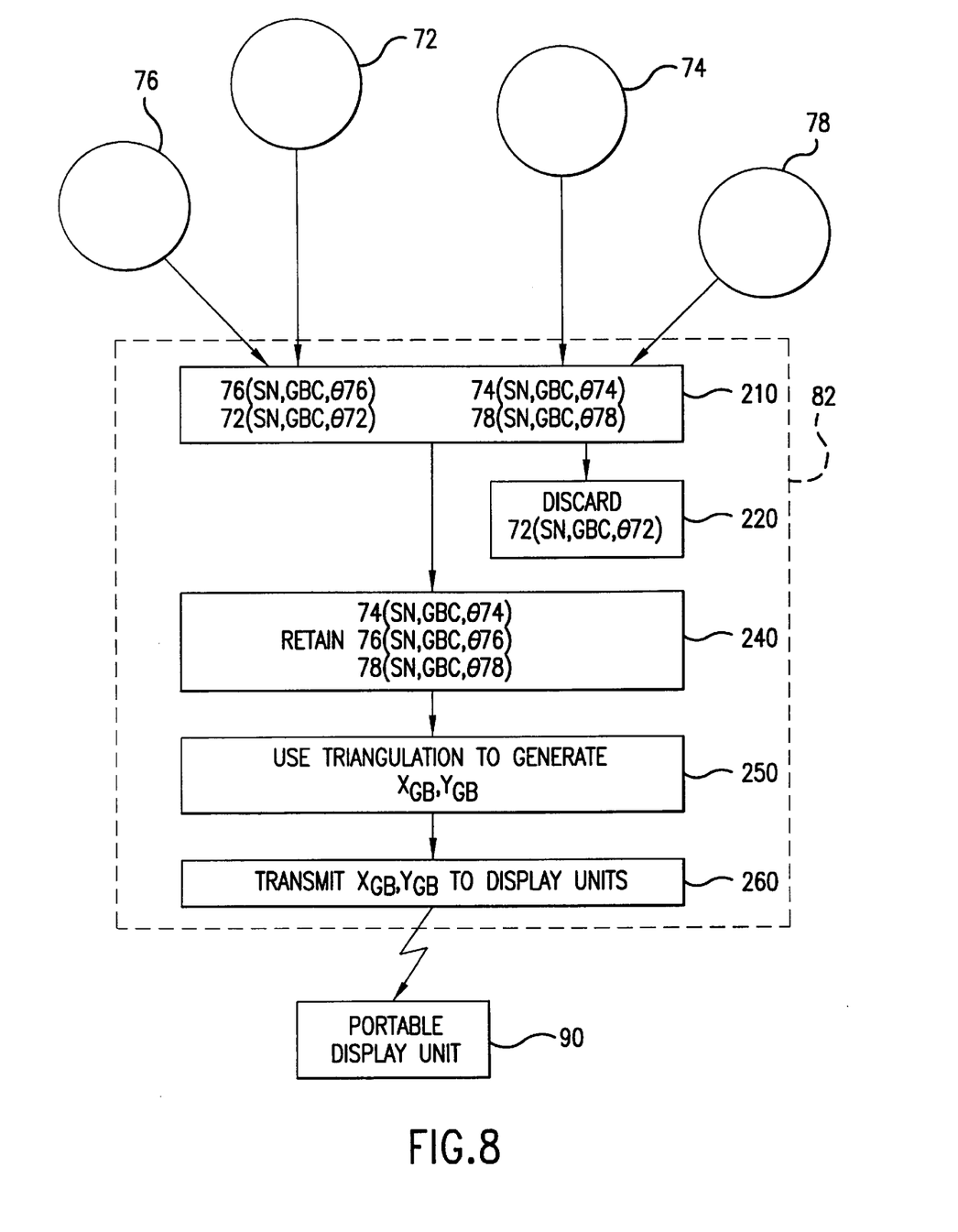
FIG. 8 is a flow chart indicating the steps performed by the first embodiment control unit according to the present invention.

FIG. 8 illustrates the steps taken by processor 82 after receiving data in step 210 from elevated directional finders 72–78. As noted above, in relation to FIG. 6, the pulsed coded infrared signal 100 can be received by several elevated directional finders 72–78. However, because of step 110 of FIG. 7, only the elevated directional finders, receiving a signal with a signal amplitude SA greater than or equal to a predetermined threshold, transmit data to the processor 82. Step 110 is essentially a first signal selecting step, so that processor 82 is not burdened by too much data, but only receives the data corresponding to signals with good signal amplitudes. Alternatively, of course, the raw data, unprocessed by the receivers, can be sent to the processor 82 for processing by processor 82. Since the processor 82 only requires three angles to generate global coordinates, processor 82 retains, in step 240, only the three sets of data corresponding to the best three signal amplitude. In other words, step 240 is a second signal selecting step. The rest of the sets of data can be discarded in step 220. Using the three retained angles θ74, θ76, and θ78 and standard triangulation calculations as taught in U.S. Pat. No. 3,886,553, U.S. Pat. No. 4,229,740, U.S. Pat. No. 5,641,963 or U.S. Pat. No. 4,799,062, processor 82 generates in step 250 location coordinates $X_{GB}$ and $Y_{GB}$ for golf ball 10 corresponding to the location of golf ball 10 relative to the coordinate system 80 shown in FIG. 5. Finally, processor 82 transmits the location coordinates to display unit 90. Display unit 90 can be a portable display unit with visual and/or audio outputs displayed to the golfer using golf ball 10. The transmission of the location coordinates for golf ball 10 $X_{GB}$ and $Y_{GB}$ to portable display unit 90 can be performed using wireless communication.

Display two-dimensionally unit 90 can display a map of golf course 50 and using the coordinate system 80 and the location coordinates $X_{GB}$ and $Y_{GB}$, display unit 90 indicates the location of golf ball 10 directly on the golf course map by a blinking dot or any other equivalent means for indicating the location of golf ball 10 on a golf course map. For example, a similar method as taught in Green et al (U.S. Pat. No. 4,791,572) included as reference herein, could be appropriately modified and used in the present invention. Additionally, display unit 90 can also display the position coordinates themselves.

Alternatively, display unit 90 can display the position coordinates by themselves, for example on a pager unit.

Advantageously, the coordinates of various obstacles and targets of the golf course 50 can also be stored in a memory of the display unit 90, so that display unit 90 can display distances between these landmarks and the golf ball 10. Actual distances between the landmarks, one of which may be the pin hole itself, and the ball can also be calculated and displayed themselves to help the golfer with golf club selection. For example, using a screen pointing device, the golfer can point to these landmarks and make the display units display the distances between the designated landmarks and the golfer's ball.

Additionally, the processor 82 can store in memory speech synthesized data and can transmit to the display unit location information based on the location of the ball relative to the landmarks of the golf course. For example, the display unit can output the following audio signal: "your ball is located fifty feet from the left sand trap in a North-West direction".

In a second embodiment of the present invention, an electromagnetic transmitter located inside a golf ball transmits an electromagnetic signal in the radio frequency part of the electromagnetic spectrum using a conventional radio frequency circuit with an antenna, for example as disclosed in U.S. Pat. No. 5,423,549, or a combination of antennas. As in the first embodiment, the identification of a particular golf ball can be performed using a particular pulsing frequency, amplitude, duration or pulse sequence. Furthermore, the signal can be frequency modulated, and/or amplitude modulated, and/or phase modulated, and/or spread spectrum modulated, for example as in U.S. Pat. No. 4,799,062. In this embodiment, the electromagnetic receivers comprise radio frequency receivers and perform the same functions as described in the first embodiment of the present invention. The electromagnetic receivers can measure either the angle of arrival as taught in U.S. Pat. No. 4,229,740, U.S. Pat. No. 4,742,357 or the time of arrival as disclosed in U.S. Pat. No. 3,886,553, U.S. Pat. No. 4,742,357, and U.S. Pat. No. 4,799,062. The processor and the display units also perform the same functions as described in the first embodiment of the present invention.

In a third embodiment, the system of the present invention further comprises a mobile position location device on the golf cart being driven by the player using the golf ball, or on the player himself/herself. This mobile position device typically will include a transmitter transmitting a signal similar to that transmitted by the golf ball, but with different modulated identification information, with the "player signal" being received by the receivers and used to calculate player or golf cart position coordinates in the same manner as golf ball position coordinates are generated.

Alternatively, the golf cart/player mobile position location device can be a Global Positioning System (GPS) unit. For example, a GT Plus Oncore Receiver by MOTOROLA can be appropriately modified for the present invention. The GPS unit receives GPS coordinates and can either translate them into golf cart/player coordinates $X_{GC}$ and $Y_{GC}$ belonging to the coordinate system 80 and then transmit the golf cart coordinates to the processor, or transmit the GPS coordinates to the processor 82 for translation into golf cart coordinates which can then be sent to the display unit.

In this embodiment, it is further possible for the processor to store predetermined instructions in a memory, selected in relation to the relative coordinates of the golf cart and the golf ball, transmit these instructions to the display unit thereby instructing the golfer what direction to drive the cart to find the ball. Similarly, such instructions can be given relative to existing landmarks on the golf course and/or the particular hole being played, thereby to automatically guide the player to his/her ball. To assist in such guiding, the golf cart or player can be equipped with a compass, for example, and the instructions to the golfer can inform the golfer of a compass heading and a distance to be followed at regular intervals. These driving instruction can be displayed visually or audibly. Of course, in the case of audible direction, the driving instructions being stored in a memory of processor 82 are speech synthesized. For example, the audio output can inform the golfer of where the ball is located relative to landmarks pre-programmed into the processor, e.g. "The ball is located 5 yards behind the green and 6 yards to the right of the green", or "The ball is located 10 yards to the left of the fairway and 20 yards beyond the 100 yard marker", and then give instruction to the golfer as to what path to take to find the ball. For example, "Please proceed 100 yard toward the pin, then turn right."

Advantageously, because the processor is tracking the golf cart position as it moves, these driving instructions can be regularly updated as the golfer makes his/her way toward the ball. For example, the display unit can output "you're about to turn right . . . please turn right . . . proceed 50 yard . . . you're about to turn left . . . please turn left . . . you're ball is 35 yards ahead . . . ." Similar systems are optionally provided in automobiles and could be appropriately modified for the present invention, for example a navigation system is offered in some LEXUS 1998 GS 400 models.

Obviously, numerous modifications and variations of the present invention are possible in light of the above teachings. It is therefore to be understood that within the scope of the appended claims, the invention may be practiced otherwise than as specifically described herein.

What is claimed is:

1. A golf ball locator system comprising:
   a golf ball including an electromagnetic signal transmitter;
   at least two electromagnetic signal receivers configured to receive an electromagnetic signal transmitted by the golf ball;
   a processor coupled to the receivers and configured to receive signals from the receivers and determine a location of the golf ball using triangulation calculations; and
   a display configured to display the location of the golf ball determined by the processor in relation to a two-dimensional map including at least one identifiable landmark.

2. A system as recited in claim 1, wherein said transmitter further comprises:
   a shock initiated switch circuit to turn the transmitter ON; and
   a first timing circuit to turn the transmitter OFF.

3. A system as recited in claim 2, wherein said transmitter further comprises:
   a second timing circuit for delaying said electromagnetic transmission a predetermined time period after the transmitter has been turned ON by said shock initiated switch circuit.

4. A system as recited in claim 1, wherein said transmitter further comprises:
   a pulsing circuit for generating said electromagnetic signal at a predetermined pulsing frequency assigned to said golf ball thereby allowing identification of said golf ball by said receivers.

5. A system as recited in claim 1, wherein said transmitter further comprises:
   means for modulating said electromagnetic signal with identification information thereby allowing identification of said golf ball by said receivers.

6. A system as recited in claim 1, wherein said processor comprises:
   means for determining at least part of the golf ball's flight path;
   means for interpolating a position of said golf ball based at least in part on the determined flight path; and
   means for transmitting interpolated positions to the display means.

7. A system as recited in claim 1, wherein said receivers comprise:
   an angle of arrival detection system.

8. A system as recited in claim 1, wherein said receivers comprise:
   a time of arrival detection system.

9. A system as recited in claim 1, wherein said transmitter comprises:
   a power source, and
   at least one infrared diode coupled to the power source and capable of emitting infrared radiation.

10. A system as recited in claim 9, wherein said transmitter further comprises:
    a modulation mechanism configured to modulate infrared diode with identification information.

11. A system as recited in claim 1, wherein said transmitter comprises:
    a radio frequency signal source.

12. A system as recited in claim 11, wherein said transmitter further comprises:

a modulation mechanism configured to modulate the radio frequency signal source with identification information.

13. A system as recited in claim 12, wherein said modulation mechanism comprises:

a frequency modulator.

14. A system as recited in claim 12, wherein said modulation mechanism comprises a spread spectrum modulator.

15. A system as recited in claim 1, further comprising:

means for determining a position of a golfer or golf cart associated with the golf ball; and means for transmitting the position to said processor.

16. A system as recited in claim 15, wherein said processor comprises:

means for generating traveling instructions based at least on the determined position of said golf cart or golfer and said golf ball location; and means for transmitting said traveling instructions to said display means.

17. A system as recited in claim 16, wherein:

said traveling instructions comprise speech synthesized driving instructions; and said display means comprises an audio output to output said speech synthesized traveling instructions.

18. A system as recited in claim 16, wherein said processor comprises:

means for periodically updating traveling instructions during travel of the golf cart or golfer to the golf ball.

19. A system as recited in claim 1, wherein said processor comprises:

means for determining distance to the pin based on the determined golf ball position; and means for transmitting "distance to the pin" information to the display means for display of said "distance to the pin" information.

20. A method of locating a golf ball, comprising:

transmitting an electromagnetic signal from the golf ball;

receiving said electromagnetic signal;

determining a golf ball location using triangulation calculations; and displaying said location in relation to a two-dimensional map including at least one identifiable landmark.

21. A method as recited in claim 20, further comprising:

modulating said electromagnetic signal; and identifying said golf ball from a modulation of said electromagnetic signal.

22. A method as recited in claim 20, further comprising:

calculating the distances between the golf ball and various landmarks on a golf course; and displaying said distances.

23. A method as recited in claim 20, further comprising:

determining a location of a player playing the golf ball; and communicating traveling instructions to the player to find the golf ball.

24. A method as recited in claim 20, further comprising:

periodically updating said traveling instructions during travel of said player to said golf ball.

* * * * *